(12) United States Patent
Lelievre et al.

(10) Patent No.: US 6,937,793 B2
(45) Date of Patent: Aug. 30, 2005

(54) TUNABLE CHROMATIC DISPERSION COMPENSATOR

(75) Inventors: Sylviane Lelievre, Québec (CA); Richard L. Lachance, Sainte-Foy (CA); Yves Painchaud, Sillery (CA)

(73) Assignee: Teraxion Inc., Sainte-Foy (CA)

( * ) Notice: Subject to any disclaimer, the term of this patent is extended or adjusted under 35 U.S.C. 154(b) by 138 days.

(21) Appl. No.: 10/390,590

(22) Filed: Mar. 17, 2003

(65) Prior Publication Data

US 2004/0017972 A1 Jan. 29, 2004

(30) Foreign Application Priority Data

Jul. 26, 2002 (CA) ............................................ 2395905

(51) Int. Cl.$^7$ .......................... G02B 6/34; H04J 14/08; H04J 14/02
(52) U.S. Cl. ............................ 385/37; 385/27; 398/81; 398/87
(58) Field of Search ............................. 385/27, 37, 11, 385/14, 24, 40–41; 250/227.18; 398/81, 87, 147, 148

(56) References Cited

U.S. PATENT DOCUMENTS

| 5,007,705 A | 4/1991 | Morey et al. |
| 5,384,884 A | 1/1995 | Kashyap et al. |
| 5,671,307 A | 9/1997 | Lauzon et al. |

(Continued)

FOREIGN PATENT DOCUMENTS

| EP | 0 867 736 A2 | 9/1998 |
| EP | 0 997 764 A1 | 5/2000 |
| EP | 1 098 212 A1 | 5/2001 |

OTHER PUBLICATIONS

Z. Pan, et al., Tunable Chromatic Dispersion Compensation in a 4x 40–Gbits/s System Using Sampled Nonlinearly–chirped Fiber Bragg Gratings (NC–FBGs), Department of Electrical Engineering–Systems, Universityof Southern California, Los Angeles, CA 90089, USA.

Francois Ouellette, "Dispersion cancellation using linearly chirped Bragg grating filters in optical waveguides", Optics Letters, vol. 12, p. 847–849, Oct. 1987.

James F. Brennan III, et al., "Realization of >10–m–long, chirped fiber Bragg gratings", BGPP 1999, pp. 35–37.

M. Durkin et al., "1m long continuously–written fibre Bragg gratings for combined second– and third–order dispersion compensation" Electron. Lett. 33, pp. 1891–1893 (1997).

A.E. Willner, et al., "Tunable Compensation of channel degrading effects using nonlinearly chirped passive fiber Bragg gratings", IEEE J. of Selcted Topics in Quantum Electron., 5, pp. 1298–1311 (1999).

T. Imai, et al., "Dispersion Tuning of a Linearly Chirped Fiber Bragg Grating Without a center Wavelength Shift by Applying a Strain Gradient", IEEE, Jun. 1998, pp. 845–847.

Loh et al., "Sampled Fiber Grating Based–Dispersion Slope Compensator", IEEE Photonics Tech. Lett. 11, No. 10, pp. 1280–1282, Oct. 1999.

(Continued)

Primary Examiner—Brian Healy
Assistant Examiner—Michael P. Mooney
(74) Attorney, Agent, or Firm—Darby & Darby

(57) ABSTRACT

A tunable dispersion compensator for the compensation of the chromatic dispersion experienced by a single-channel or multi-channel light signal. The compensator includes a plurality of optical structures such as chirped Bragg gratings or combinations thereof, each having a characteristic dispersion profile. An optical coupling arrangement successively propagates the light signal in each of these structures, so that it accumulates the dispersion compensation effect of each. A tuning device jointly tunes the dispersion profile of each optical structure by applying a same tuning force thereto, preferably a temperature gradient.

10 Claims, 4 Drawing Sheets

U.S. PATENT DOCUMENTS

| | | |
|---|---|---|
| 5,694,501 A | 12/1997 | Alavie et al. |
| 5,982,963 A | 11/1999 | Feng et al. |
| 6,122,421 A | 9/2000 | Adams et al. |
| 6,148,127 A | 11/2000 | Adams et al. |
| 6,304,696 B1 | 10/2001 | Patterson et al. |
| 6,360,042 B1 | 3/2002 | Long |
| 6,363,187 B1 | 3/2002 | Fells et al. |
| 6,381,388 B1 | 4/2002 | Epworth et al. |
| 2001/0048788 A1 | 12/2001 | Xie et al. |
| 2002/0025110 A1 | 2/2002 | Kersey et al. |
| 2002/0048430 A1 | 4/2002 | Hashimoto et al. |
| 2003/0152320 A1 * | 8/2003 | DeBaun et al. ............... 385/27 |

OTHER PUBLICATIONS

J.A.J. Fells, et al., Twin Fibre Grating Adjustable Dispersion Compensator for 40 GBIT/S Proc. ECOC 2000.

T. N. Nielsen, et al., "Fiber Bragg Grating Tunable Dispersion Compensator for Dynamic Post Dispersion Optimization at 40 Gbit/s", 25th European conference on optical communication (ECOC '99), Nice, France, Sep. 1999, pp. I–34–I–35, XP001035308.

Patent Abstract of Japan, vol. 2002, No. 07, Jul. 2002, JP 2002 072034 A (Hitachi Cable Ltd.), Mar. 2002, Abstract.

* cited by examiner

TUNABLE CHROMATIC DISPERSION COMPENSATOR

FIELD OF THE INVENTION

The present invention relates to the compensation of chromatic dispersion occurring in waveguides such as optical fibers. More specifically, the invention concerns a multi-grating based tunable dispersion compensator.

BACKGROUND OF THE INVENTION

In optical telecommunication systems, one of the many difficulties encountered is the chromatic dispersion of light signals propagating over long distances in optical media such as optical fibers. Chromatic dispersion causes light pulses to spread out as they travel along an optical fiber. It occurs because the different spectral components at different wavelengths in a pulse travel at slightly different speeds. An optical pulse, which comprises different optical spectral components, therefore, can be broadened or distorted in shape after propagation through a distance in such a dispersive optical medium. This dispersion effect can be undesirable and even adverse for certain applications such as optical communication systems where information is encoded, processed, and transmitted through optical pulses. As the pulses spread, they can overlap and interfere with each other, thereby impacting signal integrity and limiting the transmission bit rate, the transmission bandwidth, and other performance factors of the optical communication systems. The effect becomes more pronounced at higher data rates. Pulses at different wavelengths typically suffer different amounts of dispersion. The chromatic dispersion in standard single-mode optical fiber is nominally 17 ps/(nm·km) in the 1550 nm telecommunication window, but this value changes as a function of the wavelength: its value changes by about 2 ps/(nm·km) between 1530 nm and 1565 nm.

Correction Methods

One way to mitigate the chromatic dispersion in dispersive optical fibers and other optical transmission media is to recompress the optical pulses using an optical element that provides dispersion that is just the opposite of the one of the fiber link. This process is referred to as dispersion compensation.

A dispersion compensating fiber (DCF) is a specialty optical fiber used to compensate for the dispersive effects encountered during signal transmission. Basically, this fiber has a dispersion characteristic of opposite sign to the optical fiber used for transmission. While a dispersion compensating fiber is generally a broadband solution to first order dispersion (dispersion slope), it does not properly compensate for second order dispersion. That is, the optimum length of these specialty fibers varies with channel wavelength. Thus, in a WDM system where multiple wavelengths are transmitted, no one length of dispersion compensating fiber precisely accommodates all channel wavelengths.

An alternative way of providing dispersion is based on Fiber Bragg gratings (FBGs), a well-established technology for optical telecommunications. Basically, a Bragg grating allows light propagating into an optical fiber to be reflected back when its wavelength corresponds to the grating's Bragg wavelength, related to its period. A chirped FBG, in which the grating period varies along the fiber axis, represents a well-known solution for compensating the chromatic dispersion of an optical fiber link (F. Ouellette, "Dispersion Cancellation Using Linearly Chirped Bragg Grating Filters in Optical Waveguides", Opt. Lett., 12, pp. 847–849, 1987). Such a grating compensates for the accumulated dispersion since the group delay varies as a function of the wavelength. An appropriate grating can be fabricated such that the wavelength dependence of its group delay is just the opposite of that of the fiber link.

Depending on system network configuration, different levels of dispersion correction may be required, and often to compensate residual dispersion error of a DCF spool a zero-centered of dispersion range is needed for compensating the residual dispersion error remaining. By themselves, single chirped FBGs are not well suited for obtaining such zero centered dispersion levels. There is therefore a need for a device offering this feature. There is also a need for a device allowing an increase of the dispersion range.

Critical factors that affect dispersion compensation at high bit rate are changing traffic patterns, temperature fluctuations along the fiber, modulation format, component dispersion levels and dispersion variations in the transmission fiber (from manufacturing variances). To accommodate these factors, 40 Gb/s systems require not only fixed, broadband slope-compensated dispersion-compensating devices, but also tunable dispersion technology to adjust the dispersion compensation in real-time for different WDM channels.

Prior Art

The wavelength of peak reflection for a Bragg grating can be shifted by a change in either the strain or the temperature (or both) imposed on the grating. If the grating is subject to a strain or temperature gradient the modulation period of the index of refraction and the mean index of refraction becomes a function of position along the grating.

It is known in the art how to tune FBGs for various purposes, among which methods for creating tunable dispersion compensators.

If a linearly chirped FBG is uniformly stretched, the period is changed, and accordingly the Bragg reflection wavelength is also changed, but the dispersion remains unchanged. A similar situation pertains if, instead of stretching the fiber, a uniform heating is applied to the grating.

On the other hand, a non uniform heating, such as to produce a thermal gradient along the waveguide axis in the region of the grating, induces a chirp in the grating, or modifies an existing one. Controlling the magnitude of the thermal gradient controls the magnitude of the resulting chirp, and thus there is provided a form of adjustable amplitude linear dispersion compensation device. Such a device is for instance described by different implementations described hereinafter.

U.S. Pat. No. 5,671,307 (LAUZON et al.) discloses the use of a temperature gradient to impose a chirp on a FBG. By inducing a uniform linear variation of the local temperature over the length of the FBG, a slope variation of the time delay can be obtained, resulting in a variation of the dispersion compensation. The temperature gradient is realized by providing heat conductive means such as a thin brass plate to hold the portion of the fiber provided with the Bragg grating, and pairs of Peltier effect plates sandwiching each end of the fiber to selectively apply and dissipate heat to end from the ends of the fiber. Lauzon suggests that the device might be used as an accurately tunable dispersion compensator for optical fiber communication links. This pure thermal approach avoids any stresses in the fiber, allowing highly reliable implementations of the principle, as for the one given in the Canadian patent applications no. 2,371,106 and 2,383,807 (LACHANCE et al.) where a power efficient means for obtaining a linear temperature gradient in a thin conductive rod are disclosed.

Based on the same idea, European patent No. 0 997 764 (EGGLETON et al.) disclose an optical waveguide grating with adjustable chirp formed by a waveguide grating in thermal contact with an electrically controllable heat-transducing body which varies the temperature along the length of the grating. The heat transducing body, formed for example by a tapered film coating whose resistance varies along the length of the grating, can generate heat on the fiber to establish a temperature gradient along the grating.

A plurality of localized heaters can also be used along the length of the chirped FBG to alter its properties in order to tune the chirp and to produce tunable dispersion compensators. U.S. Patent Application 2002/048430 (HASHIMOTO) presents such an approach where an optical fiber is coupled to a succession of localized heaters mounted on a substrate. Linear temperature gradients are obtained which tune the dispersion in the linearly chirped FBG placed in close contact.

Similarly, if the waveguide is subjected to a stretching that is not uniform, but is such as to produce a strain gradient along the waveguide axis, then the effect is to produce a controllable amplitude of chirp. European patent No. 0 867 736 (FARRIES et al.) discloses a temperature-based device that combines the application of a temperature gradient and an optical strain to modify the optical properties of the grating. T. Imai et al. ("Dispersion Tuning of a Linearly Chirped Fiber Bragg Grating Without a Center Wavelength Shift by Applying a Strain Gradient", IEEE June 1998, pp. 845–847) and U.S. Pat. No. 6,360,042 (LONG) describe devices in which a strain gradient is imparted to an optical fiber waveguide by bonding a portion of its length to a cantilever, and then bending that cantilever. U.S. Pat. No. 5,694,501 (ALAVIE) is another example of such a device in which a strain gradient is imparted to an optical fiber by cantilever bending and also by bonding it to the side of a stack of electrostrictive elements, and then applying a differential drive to those elements. The use of magnetostriction for grating chirping can also be used, as disclosed by U.S. Pat. No. 6,122,421 (ADAMS et al.). This patent discloses a programmable and latchable device for chromatic dispersion compensation based on a gradient magnetostrictive body bonded along the length of the fiber grating. In such a device, the magnetic field causes the body to expand or contract depending on the material. These devices however imply gluing the fiber to a metallic block along its entire length, which in practice is a technologically challenging operation.

The uniform stretching of an optical waveguide possessing a chirped Bragg grating with a quadratic component of its chirp can also induce a change in the linear dispersion afforded by the structure, as described in U.S. Pat. No. 5,982,963 (FENG). This approach allows a tuning of the dispersion but the spectral duty factor is limited to about 25%. Furthermore, this method relies on mechanical stretching which may cause fiber fatigue and degrade long-term reliability.

Another tunable dispersion compensator based on uniformly straining quadratically chirped FBGs is presented in U.S. Pat. No. 6,363,187 (FELLS) and in U.S. Pat. No. 6,381,388 (EPWORTH). In an effort to combat the transmission penalty associated with a quadratic chirp, this patent uses the reflection in a second Bragg grating identical to the first, but oriented to provide a quadratic component of chirp that has the opposite sign to that of the first Bragg reflection grating, and with a substantially matched modulus.

While providing useful art related to the tunability of Bragg gratings, none of the above-mentioned references discloses an adjustable, or tunable dispersion compensation device with appropriate ranges of dispersion correction.

Such a device could be one designed for operation on its own for achieving the totality of dispersion compensation. Alternatively, it could be one designed for operation in association with a fixed amplitude dispersion compensation device, such as a length of DCF. The adjustable device may be operated with some form of feedback control loop to provide active compensation that can respond to dynamic changes of dispersion within the system, and in suitable circumstances to step changes resulting from re-routing occasioned for instance by a partial failure of the system such as a transmission fiber break.

SUMMARY OF THE INVENTION

It is therefore an object of the present invention to provide a tunable dispersion compensator adapted for the compensation of the dispersion experienced by light signals in typical telecommunication systems.

It is another object of the invention to provide such a device having an adjustable dispersion range.

Accordingly, the present invention provides a tunable dispersion compensator for the compensation of chromatic dispersion in a light signal. The compensator first includes a plurality of waveguide segments, each provided with an optical structure having a characteristic dispersion profile. An optical coupling arrangement is further provided, having an input port for receiving the light signal, a plurality of input/output ports each coupled to a corresponding one of the plurality of waveguide segments for propagating the light signal therein and receiving the light signal therefrom after reflection by the optical structure of the corresponding waveguide segment, and an output port for outputting the light signal after successive reflection by each of the optical structures. The light signal thereby accumulates the characteristic dispersion profile of each of the optical structures Finally, a dispersion tuning device is coupled to the plurality of waveguide segments for jointly tuning the characteristic dispersion profile of the optical structures. This device applies a same tuning force to each of the optical structures.

Advantageously, the present invention provides a tunable chromatic dispersion compensator with extended optical properties, such as an expanded dispersion tunability range and adjustable dispersion offset level.

Other features and advantages of the present invention will be better understood upon reading of preferred embodiments thereof with reference to the appended drawings.

DESCRIPTION OF PREFERRED EMBODIMENTS OF THE INVENTION

The present invention generally provides for the versatile and practical tuning of the dispersion compensation provided by a compensator to fit real-life situations encountered in optical telecommunication systems.

Figure 3:
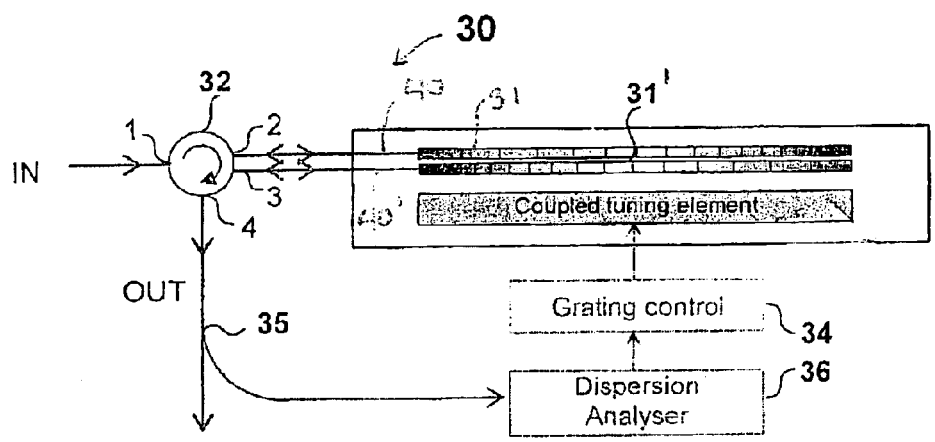
FIG. 3 is a representation of a tunable dispersion compensator.

Referring to FIG. 3, there is shown an exemplary embodiment of a tunable dispersion compensator 30 the compensation of chromatic dispersion in a light signal according to the present invention. Depending on the embodiment the light signal may include a single or multiple WDM channels. The compensator 30 includes a plurality of waveguide segments 40 each provided with an optical structure 31. Each optical structure 31 is preferably one or a combination of chirped Bragg gratings, and as such therefore a characteristic dispersion profile representing the effect it will have on the light signal it reflects. Different examples of appropriate optical structures 31 will be given below.

The compensator 30 further includes an optical coupling arrangement coupled to the waveguides segments 40, preferably embodied by a multi-port optical circulator 32. The input port 1 of the optical circulator 32 is coupled to receive the light signal from a dispersive WDM fiber system. A first input/output port 2 propagates light to the first waveguide segment 40, and receives the light signal back after reflection by the optical structure 31 provided in this segment 40. The signal is then directed to a second input/output port 3, which in turn propagates light to the second illustrated waveguide segment 40' for reflection by the corresponding optical structure 31'. The circulator includes as many input/output ports as necessary to sequentially propagate the light signal in each waveguide segment 40. Finally, the light signal is directed to an output port 4 where it exits the device. The dispersion previously experienced by the light signal is compensated by the cumulative effect of reflection by each optical structure 31 of the compensator. Although here illustrated as a multi-port optical circulator, it will be easily understood that the optical coupling arrangement can be embodied by a fused coupler, or any other device or combination of devices appropriate to perform the desired coupling function without departing from the scope of the present invention.

The compensator 30 also includes a dispersion tuning device 34 coupled to the waveguide components for jointly tuning the characteristic dispersion profile of each of the optical structures 31. The tuning device 34 applies a same tuning force to each of the optical structures 31, so that a single tuning parameter adjusts the dispersion profile of all the optical structures 31 jointly.

A previously explained two different type of tuning forces may be applied to chirped Bragg gratings to obtain the desired tuning effect: a temperature gradient or a strain gradient. A combination of both may also be used to obtain the same result. Although we will hereinafter limit the present description to the case of the use of a temperature gradient, it is understood that the scope of the present invention is not considered to be limited to this particular type of tuning.

Figure 5:
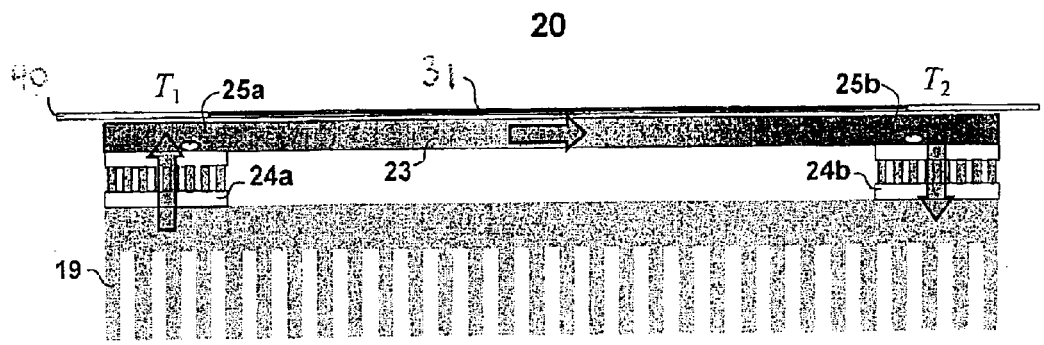
FIG. 5 is a schematic representation of the structure of a thermal gradient inducing device.

Referring to FIG. 5, there is illustrated an preferred embodiment of applying a temperature gradient to the optical structures, particularly adapted to optical fiber-based devices. Each waveguide segment 40 is therefore here embodied by a length of optical fiber. Each optical fiber 40 is preferably in close contact with an elongated heat conductive member called herein the natural gradient rod 23. This rod, preferably made out of a good metallic conductor, allows a uniform heat transfer along its length and thus creates a temperature gradient along the adjacent fibers 40. The fibers can be coupled to this rod by numerous means, using for example a lateral groove with a thermal compound to improve thermal contact. In a preferred embodiment, the optical fibers 40 are positioned in the rod 23 such that the portion of the fiber containing optical structure 31 is located at the center of the length of the rod 23.

In an alternative embodiment, the natural gradient rod is shaped as a thin cylindrical tube, preferably made of a heat conductive metal, with a small hole along its longitudinal axis into which the fibers rest freely. This preferred embodiment isolates the fibers from surrounding perturbations. A thermal compound is not required, but could be used, to ensure a good replication of the temperature profile along the natural gradient rod in the fibers. Moreover, the optical properties of the optical structures remain unaffected by the contact between the optical fibers and the natural gradient rod. Finally, long term reliability is increased since no mechanical stress is applied to the optical fibers at any time. Within this preferred embodiment, the fibers remains unaffected by the thermal expansion (or contraction) of the metallic rod, since they are not mechanically coupled to one another.

The natural gradient rod may be thermally isolated from the surroundings in order to ensure the linearity of the induced thermal gradient. A dewar type thermos system, with an inner shield to improve radiation isolation, can be used for this purpose. A low emissivity construction, using for example a rod with a mirror finish surface, will further improve the performance of the device.

Referring again to FIG. 5, two heat pumping elements 24 are preferably fixed in close physical contact at two point located at respective ends of the natural gradient rod 23, using an appropriate method like pressure mounting with a thermal compound, thermal gluing, or soldering. The heat pumping elements 24 are preferably Peltier effect Thermo Electric Coolers, referred hereafter as TECs. These elements pump heat from one side of their body to the other to fix the temperature of the extremities of the attached conductive rod 23 ($T_1$ and $T_2$), into which will settle a natural temperature gradient. In this particular approach, the temperature profile is linear. A non-linear gradient may for example be applied using the technique disclosed in U.S. Patent Application 2002/048430 (HASHIMOTO), where the optical fiber is coupled to a succession of localized heaters mounted on a substrate.

On top of each TEC 24 is fixed a temperature sensor element 25, such as a thermistor or a resistance temperature detector (RTD), in close proximity to the natural gradient rod 23. These sensors 25 are fixed in close contact with an appropriate method, using for example a thermally conductive epoxy. Signals from these sensors are used as input to a servo control system (not shown) to precisely control, that is fix and maintain, the temperature at each end of the grating. Such means for temperature control are well known in the art, comprising appropriate control electronics and drive such as TEC controllers with PID servo-control for optimum dynamic operation.

Both TECs 24 are preferably directly mounted on a heat sink 19. The heat sink 19 may consist in a standard dissipative heat sink with fins or more simply in a large heat dissipation plate. It can even be the metallic casing of a packaged device. Alternatively, the TECs may be advantageously mounted on a thermally conductive metallic recirculation bar to improve the energy efficiency of the whole device. Such an assembly is for example shown in Canadian patent applications no. 2,371,106 and 2,383,807 (LACHANCE et al), both assigned to the present assignee.

Referring back to FIG. 3, an optical coupler or a beam splitter 35 can be used to tap a small fraction of the light signal outputted from port 4 of the circulator with multiple channels for dispersion measurements into a dispersion monitor device 36. This device 36 measures the dispersion and the dispersion slope in the reflected channels and produces a dispersion indicator that can serve as a feedback in a control loop with the tuning device 34. As the dispersion in the input signal varies, the compensator 30 can respond to the changing dispersion in the fiber system by dynamically adjusting the dispersion profile of the optical structures 31 accordingly to change the amount of dispersion and associated dispersion slope for each reflected WDM channel.

The total insertion of the device will be the sum of the insertion loss associated with the circulator, plus that of the gratings and the possible fusion required. The total GDR of the device will be the square root of the sum of the squares of the GDR each grating taken independently.

Different combinations of optical structures that may be used in the present invention and examples of appropriate combinations thereof depending on the desired effects will now be explained.

Figure 1A:
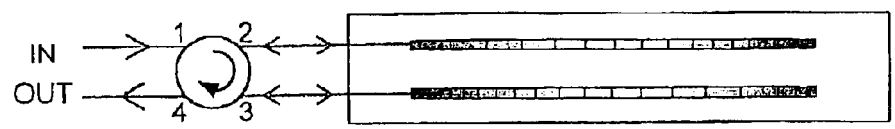
FIG. 1A is a schematized partial representation of a dispersion compensator according to a preferred embodiment of the present invention, including two optical structures embodied by chirped Bragg gratings.

Referring to FIG. 1A, the present invention may use a single chirped Bragg gratings as the optical structure in or more of the waveguide components of a compensator. Chirped FBGs may be designed to have the required chirp to allow sensitive dispersion tuning of dispersion over a given range of dispersion values, usually below or above the zero dispersion wavelength. In real fiber systems, where the zero dispersion wavelength is usually allocated near the center of the transmission band, two superimposed chirped gratings with opposite dispersions may be used to compensate for channels below and above the zero dispersion wavelength, respectively. Hence, a combination of gratings in parallel can be used to displace the dispersion values close to the required levels.

Figure 2:
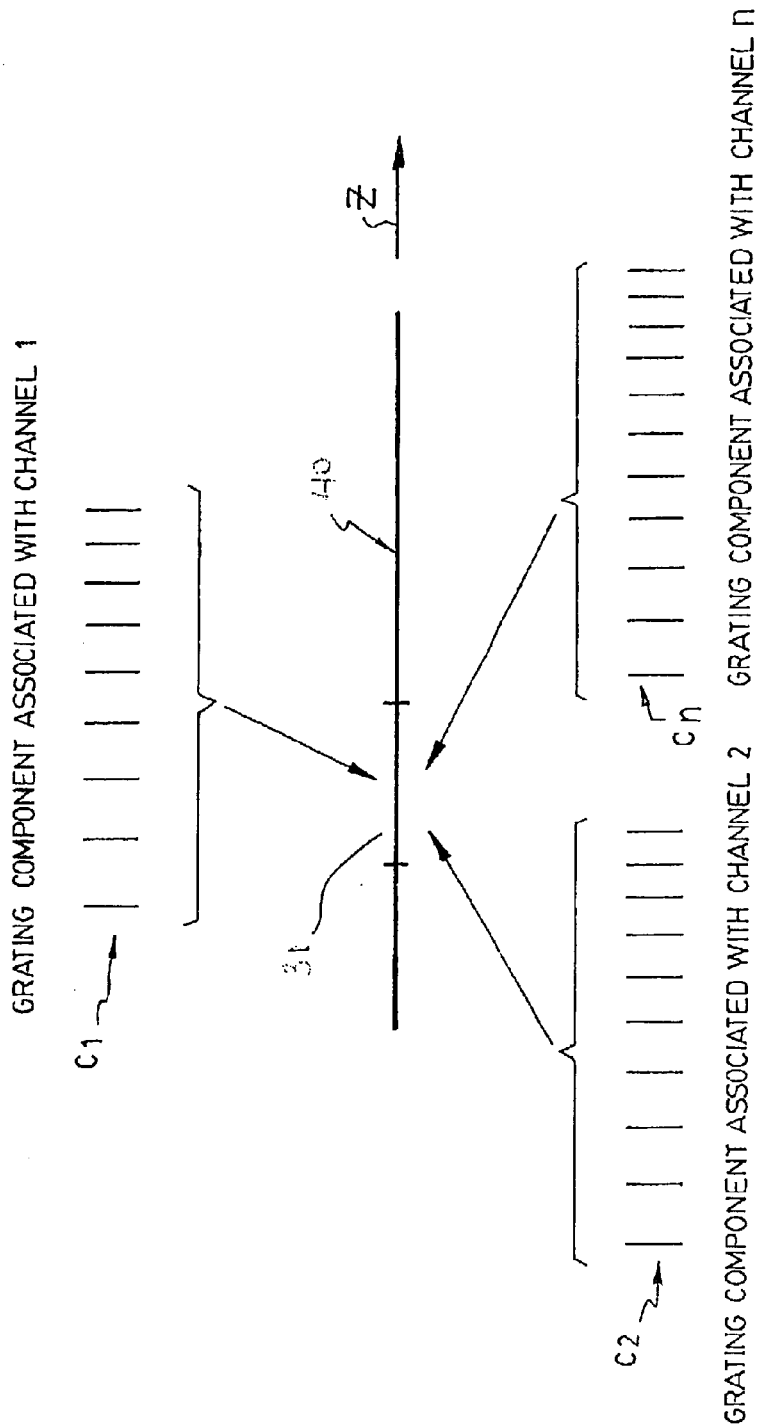
FIG. 2 shows superposed Bragg grating components embodying an optical structure according to yet another embodiment of the present invention.

Multi-channels FBGs can be used in conjunction with the multi-grating concept to allow the tuning at specific levels of dispersion of a plurality of channels. Superimposed gratings are a candidate of choice for this purpose, as they can be designed to have desired chirp and band spacing to allow sensitive dispersion tuning of dispersion at different channels. A preferred embodiment of such a type of optical structure is illustrated in FIG. 2. In this embodiment, the optical structure 31 is a Bragg grating provided in the waveguide segment 40, across the light propagation axis z. The Bragg grating 31 is made of a plurality of grating components ($c_1, c_2, \ldots c_n$). Each component is associated with a limited number of the wavelength channels of the light signal, a single one or a few, and has a spatially variable period chosen to compensate for the chromatic dispersion of this or these particular channels. In this manner, the dispersion compensation provided by the Bragg gratings takes into account the variations in dispersion experienced by each different channel. As one skilled in the art will readily understand, the limited number of channels is selected to include a few neighboring channels having dispersion characteristics close enough to be efficiently compensated by a single grating component. Typically, less than 10 channels would be an appropriate number, although a higher number could be considered if the properties of a given system allowed it. This type of optical structure is explained in detail in U.S. Patent application No. 60/307,365 (PAINCHAUD), which is incorporated herein by reference. The third or higher order non-linear effects of such gratings can be used to further improve the tuning sensitivity. When used in combination according to the present invention, different channels can be tuned to different levels of dispersion, and the system then can be designed to act as a tunable slope compensator.

Figure 1B:
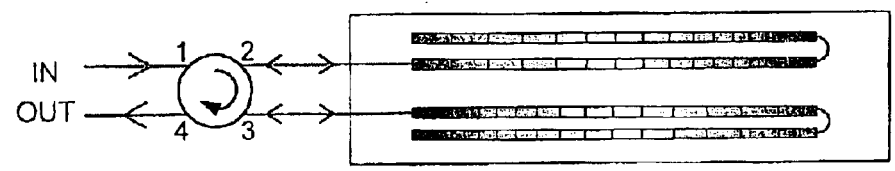
FIG. 1B shows an alternative embodiment where the two optical structures are embodied by concatenated chirped Bragg gratings.

Alternatively, with reference to FIG. 1B a similar multi-channel system can be designed using concatenated gratings but arranged so as to be all subjected to the same temperature gradient, for example by looping the fiber between each grating component to superpose the portions of fiber provided with the different grating components.

Figure 4A:
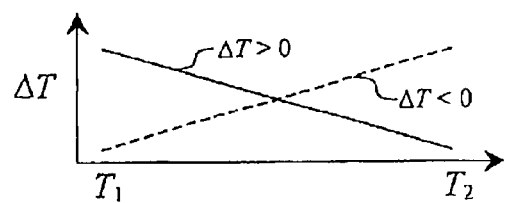
FIGS. 4A, 4B and 4C show a schematic representations of two alternative multi-grating arrangements, together with a temperature gradient reference. Long-period and short-period extremities of the chirped FBG are indicated by R and B respectively.
Figure 4B:
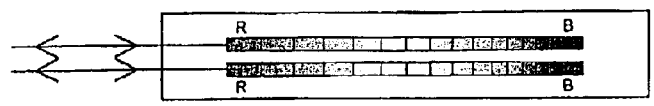
Figure 4C:
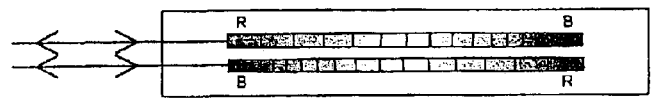

Referring to FIGS. 4A, 4B and 4C there is shown how the optical structures of a compensator may be disposed to obtain different compensating effects. The long period and short period sides of the chirps are schematically illustrated in FIGS. 4B and 4C by the letters "R" (for Reddish side) and "B" (for Bluish side). The design of FIG. 4B, where both gratings having their chirps arranged in the same direction, allows doubling the tuning range of the device. For example, if both gratings have intrinsically a tenability range extending from −300 ps/nm to −700 ps/nm, the resulting device will have a global tuning range of −600 ps/nm to −1400 ps/nm. By contrast, the device of FIG. 4C, where both gratings have their chirps opposite to one another, enable zero-crossing of the dispersion range, while also doubling the tenability range. For the same twin grating example, the resulting device will have a global tuning range of −400 ps/nm to +400 ps/nm. Of course, the above principle would hold even for non-identical gratings, which would allow to obtain different resulting compensating ranges. Applying a temperature gradient as illustrated in FIG. 4A will then displace the tuning range of both optical structures, thereby affecting the overall range of the device it will be noted that the compensator of the present invention allows to both extend or displace the dispersion range it compensates for, or both at the same time.

The joint tuning of all optical structures of the compensator is advantageous in that it provides a compact device which is energetically efficient. Controlling a single parameter also simplifies the device and decreases the error on the tuning of the gratings.

Naturally, the present invention is not limited to the preferred embodiment and materials presented herein for illustration purposes.

Figure 6:
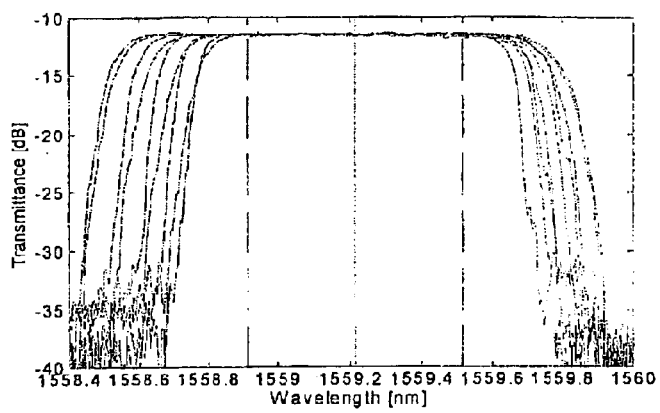
FIG. 6 shows the experimental reflectivity spectrum of a single-channel twin-grating arrangement (corresponding to FIG. 1A) under different tuning levels.
Figure 7:
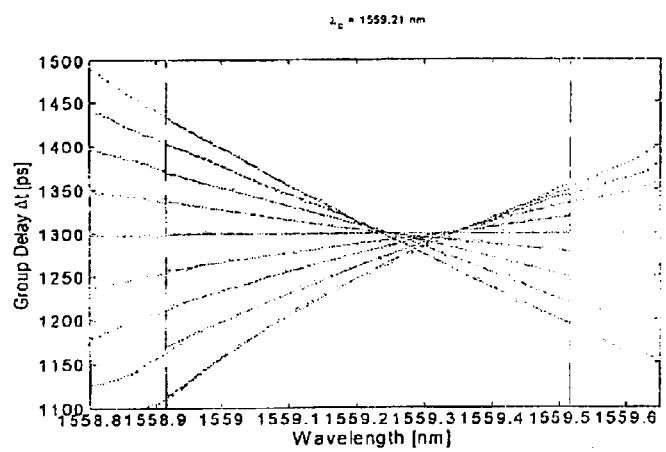
FIG. 7 shows the experimental group delay curve of this single-channel arrangement under different tuning levels.
Figure 8:
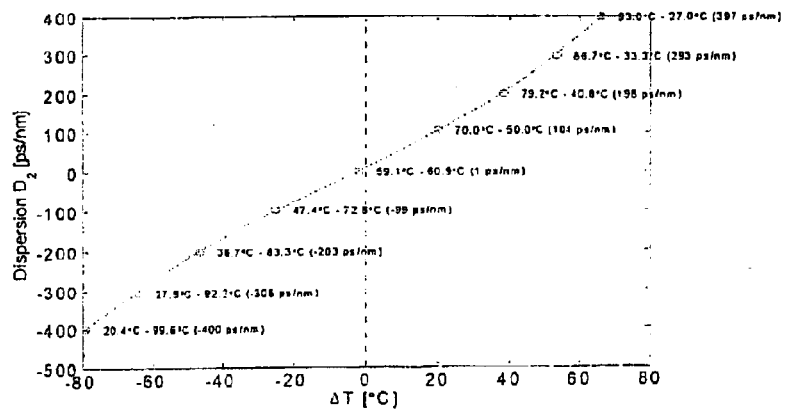
FIG. 8 shows the experimental dispersion levels attainable with this a single-channel arrangement under different tuning levels.

Referring to FIG. 6 through FIG. 8, experimental results are shown for a tunable multi-grating dispersion compensator according to a preferred embodiment of the invention. Experiments were made using opposite twin grating implementation placed in the geometry presented in FIG. 4C), each grating having individual dispersion levels covering the range −300 ps/nm to −700 ps/nm. FIG. 6 shows the reflectivity spectrum for a single WDM channel of 0.6 nm bandwidth. Under all conditions the central wavelength remains centered on the ITU wavelengths by the preferred embodiment of the tuning method which keeps constant the central temperature of the rod of the thermal gradient inducing device shown in FIG. 1. FIG. 7 shows the variation of group delay, and FIG. 8 shows the resulting dispersion tuning respectively, over the whole tuning range attainable with this device. As can be seen in FIG. 8, the resulting tuning levels cover as expected the total range extending from −400 ps/nm to +400 ps/nm.

Of course, numerous changes or modifications could be made to the embodiments described above without departing from the scope of the invention as defined in the appended claims.

What is claimed is:

1. A tunable dispersion compensator for the compensation of chromatic dispersion in a light signal, said compensator comprising:

a plurality of waveguide segments, each provided with an optical structure having a characteristic chromatic dispersion profile;

an optical coupling arrangement having an input port for receiving said light signal, a plurality of input/output ports each coupled to a corresponding one of said plurality of waveguide segments for propagating the light signal therein and receiving the light signal therefrom after reflection by the optical structure of said corresponding waveguide segment, and an output port for outputting the light signal after successive reflection by each of said optical structures, said light signal thereby accumulating the characteristic chromatic dispersion profile of each of said optical structures; and a dispersion tuning device coupled to the plurality of waveguide segments for jointly tuning the characteristic chromatic dispersion profile of said optical structures, said device applying a same tuning force to each of said optical structures.

2. The compensator according to claim 1, wherein at least one of said optical structures comprises a chirped Bragg grating.

3. The compensator according to claim 1, wherein at least one of said optical structures comprises a plurality of concatenated chirped Bragg gratings, said dispersion tuning device applying said tuning force to each of said chirped Bragg gratings.

4. The compensator according to claim 1, wherein at least one of said optical structures comprises a Bragg grating having plurality of grating components each reflecting a limited number of wavelength channels of said light signal, each of said grating components having a spatially variable period chosen to compensate for the chromatic dispersion of said limited number of channels.

5. The compensator according to claim 1, wherein two of said optical structures are chirped Bragg gratings, the characteristic chromatic dispersion profiles of said chirped Bragg gratings having a same orientation with respect to the tuning force applied thereon by said dispersion tuning device.

6. The compensator according to claim 1, wherein two of said optical structures are chirped Bragg gratings, the characteristic chromatic dispersion profiles of said chirped Bragg gratings having opposite orientations with respect to the tuning force applied thereon by said dispersion tuning device.

7. The compensator according to claim 1, wherein said optical coupling arrangement comprises a multi-port optical circulator.

8. The compensator according to claim 1, wherein the tuning force applied by said dispersion tuning device is a temperature gradient.

9. The compensator according to claim 8, wherein said dispersion tuning device comprises:

a heat conductive elongated element having opposite ends, each of said waveguide segments extending in thermal contact therealong between said opposite ends; and a heat exchanging system for maintaining the opposite ends of the elongated element at different temperatures, thereby applying said temperature gradient to the optical structures.

10. The compensator according to claim 9, wherein:

said plurality of waveguide segments are optical fiber sections; and the elongated element is shaped as a tube having a longitudinal cavity therein for receiving said optical fiber sections.

* * * * *